3,481,154
MEANS TO RETAIN FOOD AND DRINK ITEMS AT
THEIR PREPARED TEMPERATURES
Sarah A. Johnson, West Covina, Calif.
(1640 S. Pacific, Oceanside, Calif. 92054)
Filed Feb. 28, 1968, Ser. No. 709,025
Int. Cl. F25d 11/00; F28d 7/08
U.S. Cl. 62—439        2 Claims

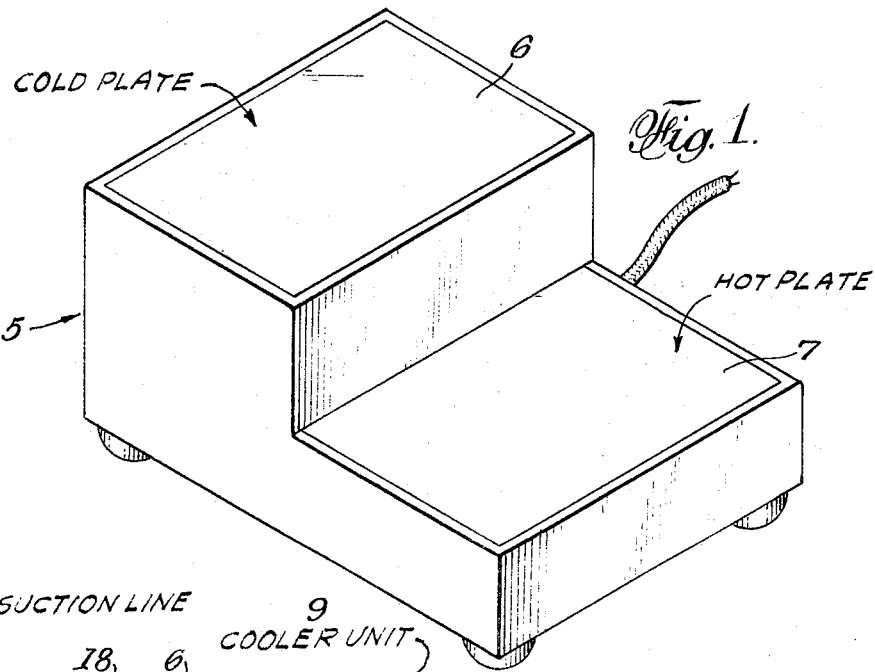
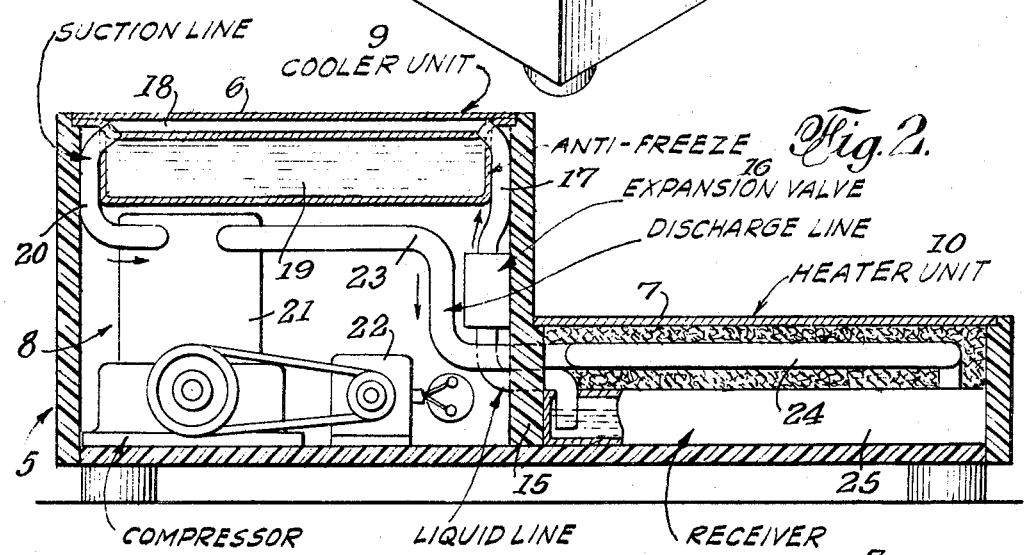
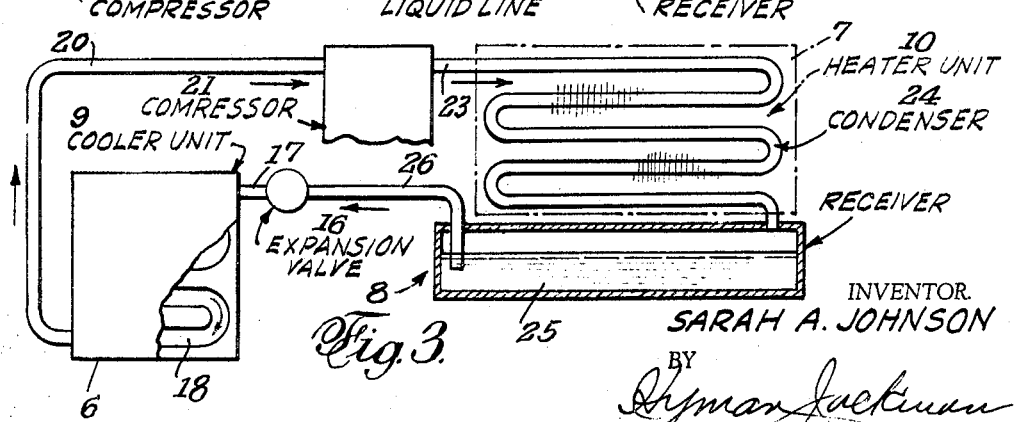

ABSTRACT OF THE DISCLOSURE

A unitary device comprising a housing enclosing refrigerating mechanism which has a cooler unit and a heater unit, the housing being formed to have two surface areas adapted to support potable and comestible items, the cooler unit being located to cool one of said areas and the heater unit being located to warm the other area, thereby to retain levels of temperatures of the items, as prepared.

Background of the invention

So-called hot plates are well known and are in common use in restaurants and homes to keep food and drinks warm in exposed areas, as on the table and on serving counters. Insofar as the applicant is aware, no such plates or devices have been made available to keep food and drinks cool in such and other exposed areas. An object of the present invention, therefore, is to provide means, as cooler plates or devices, adapted for the latter purpose.

Another object of the invention is to provide means of the character referred to that utilizes any of the several known forms of refrigeration machines and a re-design or rearrangement of the components thereof so the cooler unit thereof, usually the evaporator, and an exposed comestible- and potable-supporting surface or area of a housing of such machine are operatively associated.

A further object of the invention is to provide means as above characterized in which a second exposed comestible- and potable-supporting surface or area of said housing and a heater component, usually the condenser of such machine, are operatively associated, thereby providing in a single unitary device both a cooler and a heater unit.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

Summary of the invention

The invention comprises, generally, a housing 5 provided with a cold plate 6 and a hot plate 7, a refrigeration machine 8 enclosed in said housing and which, among its several other components, includes a cooler unit 9 located beneath and cooling the cold plate 6, and a heater unit 10 located beneath and warming the hot plate 7.

Brief description of the drawing

In the drawing, like reference characters designate similar parts in the several views.

FIG. 1 is a perspective view of a device according to the present invention.

FIG. 2 is an enlarged longitudinal sectional view thereof.

FIG. 3 is a semi-schematic view of the refrigeration means.

Description of the preferred embodiment

The embodiment illustrated shows the housing 5 formed to have two levels, a higher level for the cold plate 6 and a lower level for the hot plate 7. The air rangement may be varied provided, however, the surfaces of the two plates are not even partially coincidental vertically. Thus, said plates may be side-by-side, front and rear, or on the same or different levels. Also, the housing 5 may have the general form of a tray table in which the top gallery or rim may be modified in various ways to separate the plates 6 and 7. Also, to keep the areas housing the cooler unit 9 and the heater unit 10 separated, the interior of the housing 5 may be divided by such walls or partitions 15 as will thermally separate said areas. Such separation may be better effected by suitable insulation, as well as by forming the housing of plastic resins or such non-metallic material which will serve to lessen heat conduction between said units 9 and 10 and the areas in which they are disposed.

The shapes of the plates 6 and 7 may vary as desired, and the same are preferably flat, although shallow ridges or ribs may be provided on their surfaces, as desired.

The refrigeration machine 8 that is shown is of the compression type using a liquid refrigerant that, whether at a constant or intermittent rate, passes through an expansion valve 16 to a line 17 and then to a cooler 18 that is in the form of an evaporator coil. The latter forms parts of the cooler unit 9 which includes the plate 6 or, as shown, includes said plate as part thereof. Such expansion of the refrigerant in the low-pressure side of the refrigerator causes the plate 6 to cool, the lowering of the temperature, as is common in this type of refrigeration, being regulated by conventional thermostatic controls or the like.

The evaporated refrigerant in the evaporator coil 18 extracts heat from the surrounding medium, in this case a congealing tank 19 containing an anti-freezing solution of common form.

The refrigerant leaves the coil 18 as a low-pressure vapor, being drawn through a suction line 20 into a compressor 21 which may be driven as by an electric motor 22. On the compression stroke of the compreessor, the vapor drawn thereinto is discharged as a super-heated, high-pressure vapor, through a discharge line 23, into a condenser 24 which is located beneath the plate 7 of the heater unit 10, where said gas liquefies, accompanied by discharge of heat which raises the temperature of said plate 7. In a conventional manner, the heat discharge may be facilitated by a fan or like means.

Finally, the liquid refrigerant flows into a receiver 25 from which a liquid line 26 conducts the refrigerant back to the expansion valve 16 to complete the cycle of operation.

It will be understood that while a compression-type refrigerator has been disclosed, other mechanical, electrical, compression or absorption refrigerators may be employed, it being essential to the invention that (1) a low-temperature component of the refrigerator be so separated from the higher-temperature components thereof and the same located in cooling association with a plate 6; or (2) such a higher-temperature component be associated with a plate 7 and combined in a common housing, tray or table, to provide the latter with both a hot and a cold plate.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A refrigeration unit to retain food and drink items at the approximate temperatures at which they have been prepared, comprising:
   (a) a non-thermal housing comprising, in part, a flat-topped enclosure provided with a flat heat-conducting plate adapted to support items of food and drink on the top of the enclosure,
   (b) a refrigerating machine in which a refrigerant is circulated and comprising a cooling unit for evaporating refrigerant circulating therethrough, and a heater unit for liquefying the refrigerant circulating within the refrigerating machine,
   (c) said cooler unit being enclosed within said enclosure and located below and in close proximity to said plate to cool the latter and food supported thereon due to such evaporation of the refrigerant of the machine,
   (d) the remaining part of the non-thermal housing comprising a second flat-topped enclosure of lesser height than the first-mentioned enclosure, and provided with a flat heat-conducting plate adapted to support items of food at a level substantially lower than the first-mentioned plate, and a common wall of non-thermal material separating said two enclosures,
   (e) said heater unit liquefying the refrigerant circulating within the refrigerating machine being enclosed in said second enclosure and located beneath and in close proximity to said second plate, such liquefaction of the refrigerant being accompanied by discharge of heat from the heater unit and, accordingly, heating of said second plate, and
   (f) a congealing tank containing an anti-freeze solution located within the first-mentioned enclosure and immediately beneath the cooling plate thereof.

2. A refrigeration unit according to claim 1 in which the housing is provided with thermal insulation interposed between the cooling and heating units and between the respective plates thereof to thermally separate one plate from the other.

References Cited

UNITED STATES PATENTS

| | | | |
|---|---|---|---|
| 2,769,310 | 11/1956 | Stickland | 62—439 |
| 2,791,102 | 5/1957 | Kleist | 62—439 |
| 3,308,633 | 3/1967 | Kritzer | 165—48 |

LLOYD L. KING, Primary Examiner

U.S. Cl. X.R.

165—48